United States Patent
Jain et al.

(10) Patent No.: US 10,815,829 B2
(45) Date of Patent: Oct. 27, 2020

(54) TURBINE HOUSING ASSEMBLY

(71) Applicant: PRATT & WHITNEY CANADA CORP., Longueuil (CA)

(72) Inventors: Kapila Jain, Kirkland (CA); Patricia Phutthavong, St-Philippe (CA); Marc Tardif, Candiac (CA); Ho-Wing Leung, Chambly (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 519 days.

(21) Appl. No.: 15/454,589

(22) Filed: Mar. 9, 2017

(65) Prior Publication Data

US 2018/0258790 A1   Sep. 13, 2018

(51) Int. Cl.
  *F01D 25/14*  (2006.01)
  *F02C 3/107*  (2006.01)
  *F02C 6/20*  (2006.01)

(52) U.S. Cl.
  CPC ............. *F01D 25/14* (2013.01); *F02C 3/107* (2013.01); *F02C 6/206* (2013.01); *F05D 2240/35* (2013.01); *F05D 2260/201* (2013.01)

(58) Field of Classification Search
  CPC ..... F01D 11/24; F01D 25/12; F05D 2260/201
  See application file for complete search history.

(56) References Cited

U.S. PATENT DOCUMENTS

| 6,702,550 B2 | 3/2004 | Darkins, Jr. et al. |
| 7,607,885 B2 | 10/2009 | Bosley et al. |
| 7,740,444 B2 | 6/2010 | Lee et al. |
| 2004/0120803 A1* | 6/2004 | Lucas ............... F01D 9/04 415/116 |
| 2005/0249584 A1* | 11/2005 | Amiot ............... F01D 9/04 415/115 |
| 2016/0017750 A1* | 1/2016 | Lefebvre ............ F01D 25/12 415/175 |

\* cited by examiner

*Primary Examiner* — Ehud Gartenberg
*Assistant Examiner* — Jacek Lisowski
(74) *Attorney, Agent, or Firm* — Norton Rose Fulbright Canada LLP

(57) ABSTRACT

The turbine housing assembly includes a housing surrounding a plurality of turbine shroud segments mounted to support members of the housing. Impingement holes extend through the housing and have outlet openings communicating with a cavity between the shroud segments and the support. A deflector rail protrudes axially away from the support members into the cavity. The deflector rail defines a flow-redirecting surface to redirect the cooling air flow from the impingement holes radially outwardly, away from the turbine shroud segments.

11 Claims, 4 Drawing Sheets

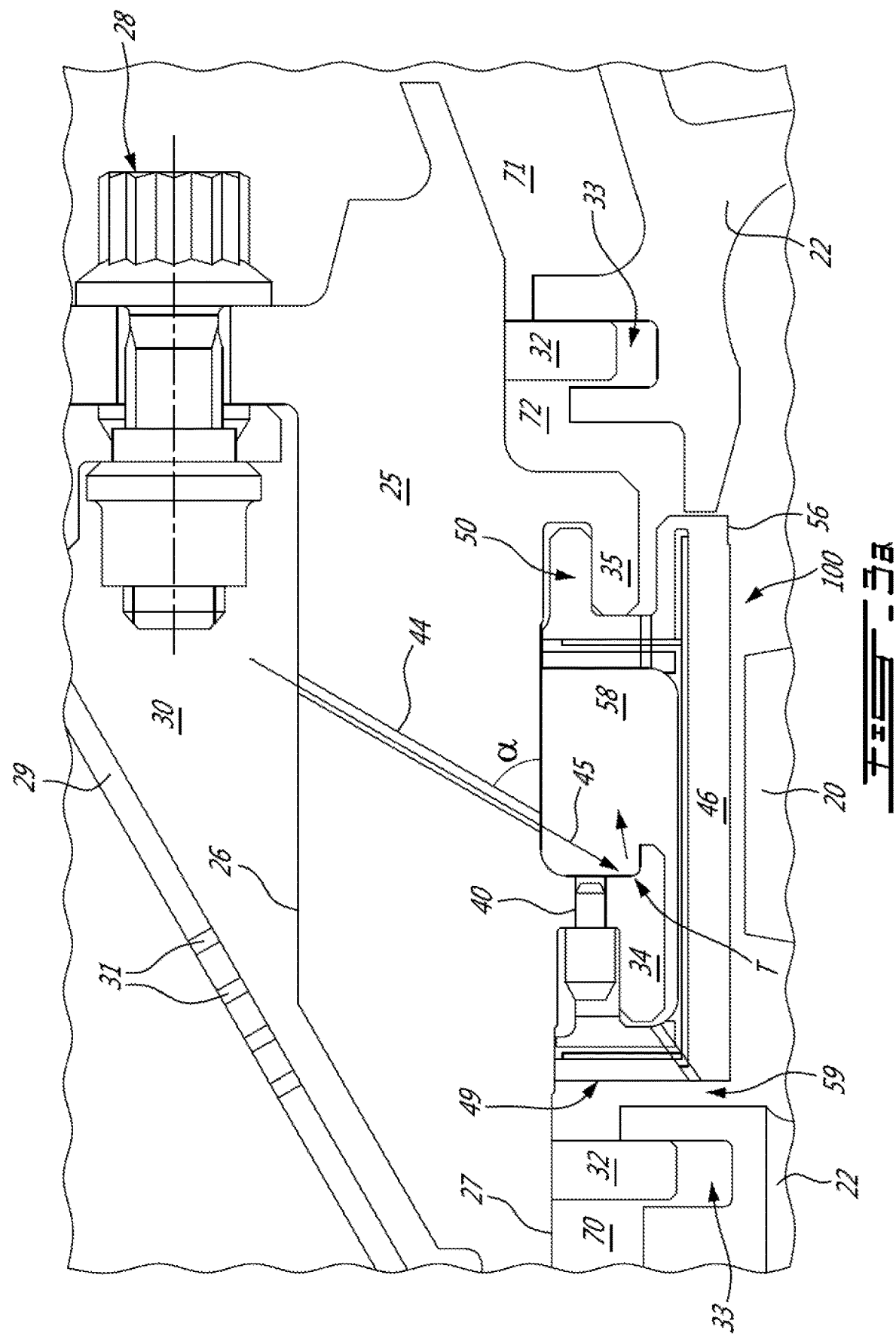

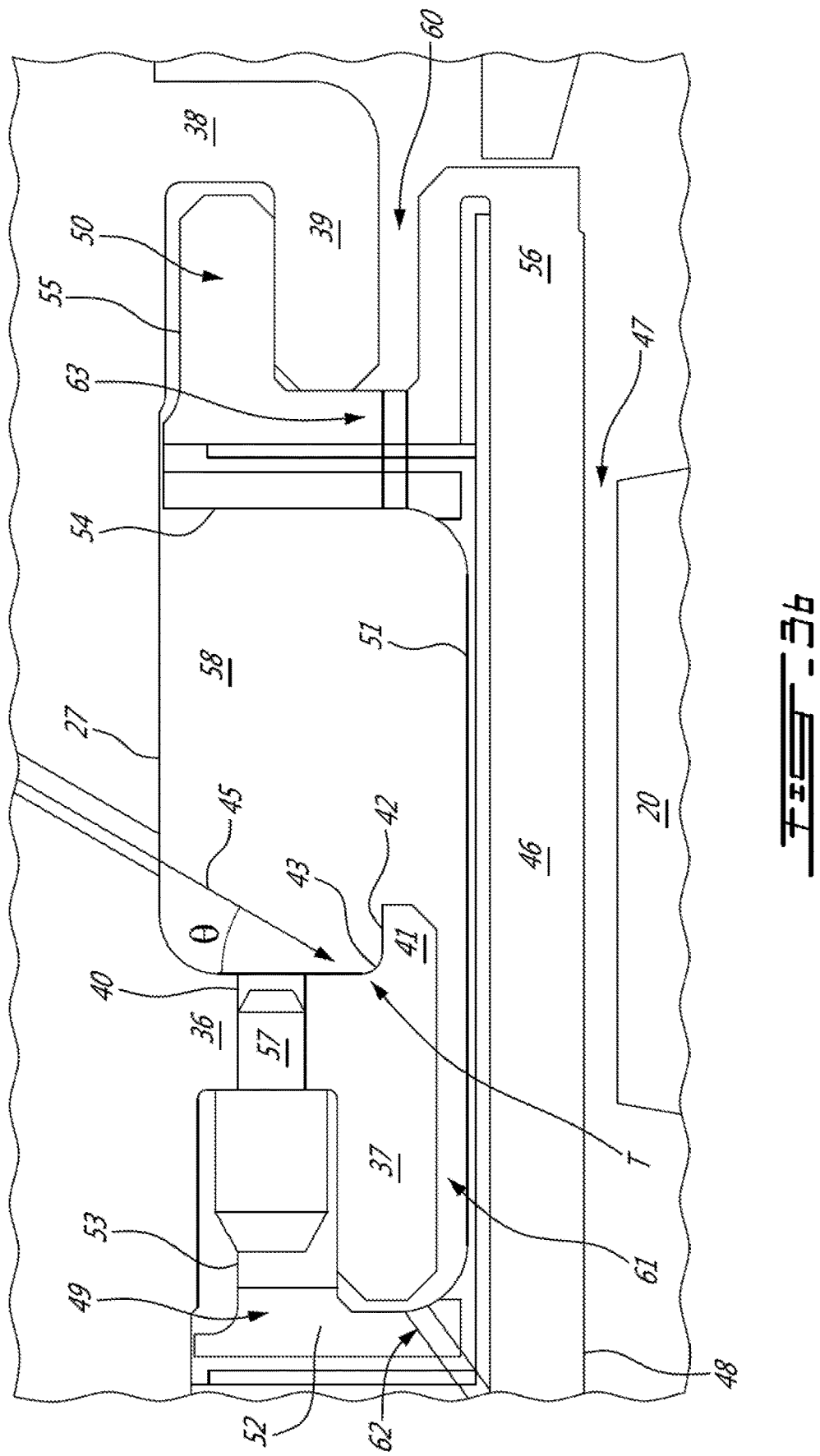

TURBINE HOUSING ASSEMBLY

TECHNICAL FIELD

The application generally relates to turbines of gas turbine engines, and more particularly to turbine housings and shroud segments surrounding turbine rotors.

BACKGROUND

In a gas turbine engine, turbine shroud segments surrounding the blades of turbine rotors are typically mounted to support members within outer turbine housing. The turbine shroud segments and their support members require cooling because of the high temperature of the exhaust gases circulating within the annular gas path surrounded by such turbine shroud segments.

The turbine housing is commonly provided with a plurality of impingement holes receiving a flow of coolant, such as cool air, therethrough. This cool air forms an impingement airflow that is directed into contact with a surface of the shroud segment or the support members of the housing to be cooled. However, in some engine configurations, the impingement airflow may deflect off an initial surface to be cooled and become redirected into direct contact with a hot outer surface of the turbine shroud segments. The impingement airflow has been found to thereby pick up heat from the turbine shroud segment, but subsequently bounce off the outer surface of the turbine shroud segment, and subsequently contact an inner side of the turbine housing. While this cools the turbine support segment, it may cause the turbine housing to become undesirably hot.

SUMMARY

There is provided a gas turbine engine comprising a housing surrounding a turbine shroud assembly, the turbine shroud assembly supported inwardly of the housing by support members of the housing to define a cavity therebetween, the housing having impingement holes extending therethrough positioned to direct cooling air through the housing onto said support members, at least some of the supports members having a deflector rail extending laterally therefrom and having a flow redirecting surface facing at least partially radially outward, the flow redirecting surface positioned and configured to redirect a cooling air flow away from the turbine shroud assembly.

There is also provided a gas turbine engine, comprising, in serial flow communication, a compressor section, a combustor and a turbine section, the turbine section having at least one turbine stage that includes a rotor, a plurality of shroud segments circumferentially surrounding the rotor, and a housing disposed around and supporting the plurality of shroud segments, the housing having impingement holes therein that open to a cavity defined between the housing and the plurality of shroud segments, the impingement holes configured for feeding an impingement flow of cooling air and defining an exit flow axis extending therethrough, the exit flow axis intersecting one or more surfaces of a support member of the housing located within the cavity, the housing having a deflector rail protruding from the support member into the cavity, the deflector rail forming an air deflecting surface facing away from the plurality of shroud segments for re-directing the impingement flow of cooling air away from the shroud segments.

There is further provided a method for cooling a turbine housing assembly surrounding a turbine of a gas turbine engine, comprising: receiving a flow of cooling air in a cavity defined between a shroud segment and the turbine housing supporting the shroud segment; impinging the flow of cooling air against a support member of the turbine housing to which the shroud segment is mounted; and deflecting the flow of cooling air at least partially radially away from the shroud segment after impingement of the flow of cooling air against the support member of the turbine housing.

BRIEF DESCRIPTION OF THE DRAWINGS

Reference is now made to the accompanying figures in which:

FIG. 3*a* is an enlarged cross-sectional view of a portion of the turbine section, taken from region A of FIG. 2; and FIG. 3*b* is a further enlarged cross-sectional view of a portion of turbine section of FIG. 3*a*.

DETAILED DESCRIPTION

Figure 1:
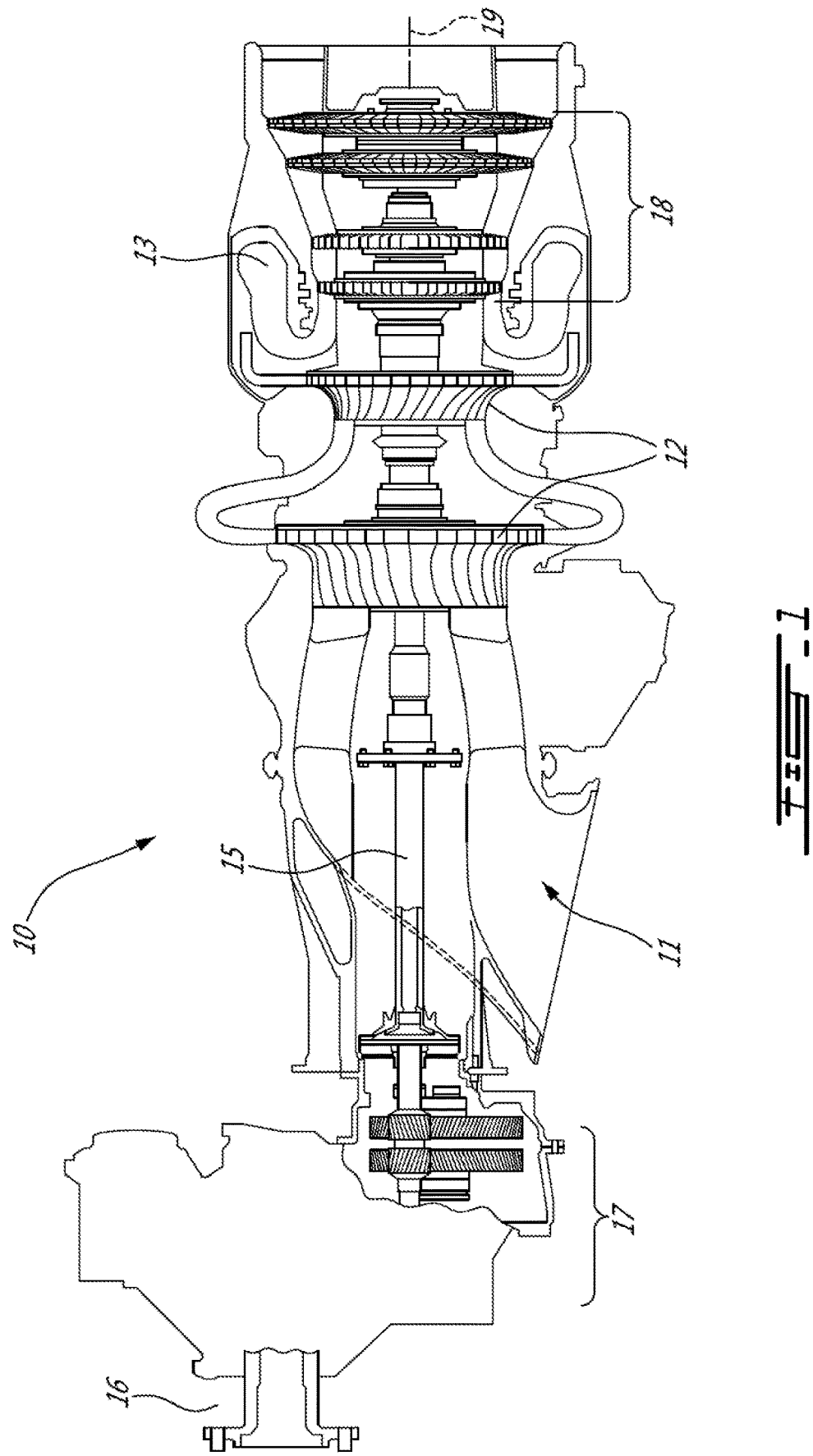
FIG. 1 is a schematic cross-sectional view of a gas turbine engine.

FIG. 1 illustrates a gas turboprop engine 10 of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 18. A power shaft 15 connected to one of the turbines 18 projects forwardly to transmit a driving force to a propeller shaft 16 via a reduction gearbox generally shown at 17.

Figure 2:
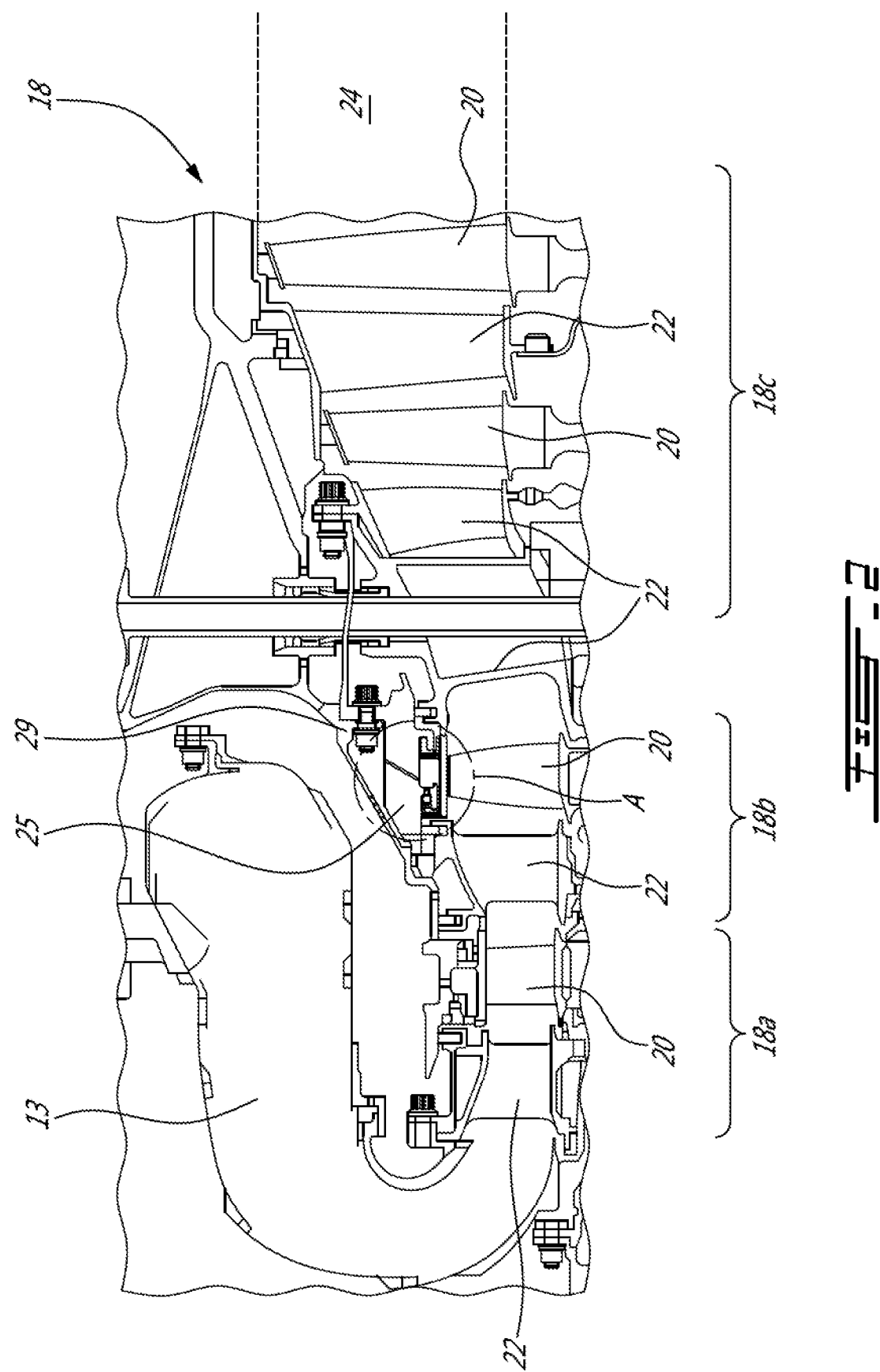
FIG. 2 is a partial cross-sectional view of the turbine section of the gas turbine engine of FIG. 1.

Now referring to FIG. 2, the turbine section 18 has a high-pressure turbine 18*a* comprising a stator 22 and a rotor 20, a low-pressure turbine 18*b*, axially offset from the high-pressure turbine 18*a* relative to an axis 19 of the engine 10, also comprising a stator 22 and a rotor 20, and a two-stage power turbine 18*c* comprising stators 22 and rotors 20. Both the high-pressure and low-pressure turbines have a plurality of blades mounted on rotors 20 and stators/struts 22 in sequential disposition along the rotational engine axis 19. In the depicted embodiment, the high-pressure turbine 18*a* is disposed immediately downstream of the combustor 13 relative to a flow of exhaust gases circulating in an annular gas path 24 of the turbine section 18.

Now further referring to FIGS. 3*a* and 3*b*, a portion A of the low-pressure turbine 18*b* is enlarged. The low-pressure turbine 18*b* has a turbine housing 25 circumferentially extending around the engine axis 19 and disposed around the turbine rotors 20 and stators/struts 22. The turbine housing 25 has an outer side 26 facing radially away from the engine axis 19 and an inner side 27 facing radially toward the engine axis 19. In the illustrated embodiment, the turbine housing 25 is made of a material having heat resisting properties, such as, but not limited to, nickel and cobalt-based allows. In the depicted embodiment, the turbine housing 25 is comprised of a plurality of sections axially distributed along an axial length of the turbine section 18 and joined together by fasteners 28.

In the embodiment shown, the turbine section 18 further comprises a turbine casing 29 disposed outwardly relative to the turbine housing 25 and circumferentially surrounding the turbine housing 25. The turbine casing 29 and the housing outer side 26 define an annular gap 30 therebetween. The turbine casing 29 defines a series of apertures 31 configured to receive a flow of coolant. In the depicted embodiment, the turbine casing 29 is made of sheet metal and is connected to the turbine housing 25 with the fasteners 28. Other ways of disposing the turbine casing relative to the turbine housing may be used without departing from the present disclosure.

In the illustrated embodiment, the turbine housing inner side 27 mates with a plurality of piston ring seals 32 which are inserted in circumferential slots 33 defined in the turbine stators/struts 22, which extend between the turbine housing inner side 27 and the engine shaft 15. In the depicted embodiment, the piston ring seals 32 prevent cooling air leakage from higher pressure cavities 70 and 71 to lower pressure cavities 59 and 72.

Still referring to FIGS. 3a and 3b, the turbine housing 25 further has a plurality of fore and aft support members 34 and 35 axially offset from one another such that the housing fore support member 34 is upstream to the housing aft support member 35 relative to a flow direction of the exhaust gases circulating in the annular gas path 24. The housing fore and aft support members 34 and 35 are protruding radially inwardly from the housing inner side 27 and are circumferentially distributed around the engine axis 19. The housing fore and aft support members 34 and 35 have an "L" shape oriented upstream relative to the direction of the exhaust gases. The housing fore circumferential support member 34 has a radial portion 36 extending radially inwardly from the housing inner side 27 and an axial portion 37 axially extending, away from a radially inner end of the housing fore support member radial portion 36, in an upstream direction relative to the direction of the exhaust gases. Similarly, the housing aft circumferential support member 35 has a radial portion 38 radially extending inwardly from the housing inner side 27 and an axial portion 39 axially extending from a radially inner end of the housing aft support member radial portion 38, in the upstream direction. An aperture or hole 40 extends axially through the radially extending portion 36 of each housing fore support members 34.

In the illustrated embodiment, the housing fore support member 34 further has a circumferential deflector rail 41 laterally or axially extending from the radially inner end of the housing fore support member radial portion 36. The deflector rail 41 extends, in at least the depicted embodiment, laterally or axially in a downstream direction, toward the housing aft support member 35. A radially outer side of the deflector rail 41 defines an air flow deflecting surface 42 facing at least partially radially outward (i.e. radially away from the longitudinal engine centerline axis 19). In the depicted embodiment, the air deflecting surface is annular and concentric with the engine axis 19. The deflector rail 41 and the housing fore support member radial portion 36 define an intersection 43. In the embodiment shown, the intersection 43 defines an angle of 90 degrees. This angle may vary from 60 to 120 degrees. In the present embodiment, the intersection 43 is filleted. In the depicted embodiment, an axial length of the deflector rail 41 is from 5% to 15% of an axial length of the shroud segment 46.

In the depicted embodiment, the turbine housing 25 defines a plurality of impingement holes 44 extending between the turbine housing outer side 26 and the turbine housing inner side 27. At least one of some of the impingement holes 44 has an exit flow axis represented by arrow 45. In the embodiment shown, the exit flow axis 45 intersects the housing fore support member radial portion 36 at target T. An angle α between the impingement hole exit flow axis 45 and the turbine housing inner side 27 is from 30 to 90 degrees. Further details regarding the impingement hole 44 are presented herein below.

The low-pressure turbine 18b further comprises a shroud assembly 100. In the illustrated embodiment, the shroud assembly 10 has a plurality of shroud segments 46 disposed radially inwardly relative to the turbine housing 25 and radially outwardly relative to the turbine rotor 20. The skilled reader will appreciate the turbine shroud assembly need not be segmented as described herein. The shroud segments 46 are axially aligned with the rotor and are circumferentially disposed to surround the rotor 20. A radial gap 47 is defined between the rotor 20 and a radially inner side 48 of the shroud segments 46 to preclude rubbing therebetween. In the depicted embodiment, the inner side 48 of the plurality of shroud segments 46 defines a cylindrical, substantially continuous surface around the rotor 20. In a turbine section comprising more than one turbine stage, a plurality of shroud segments 46 may be disposed around more than one of the rotors 20 of the turbine section 18.

In the illustrated embodiment, each of the shroud segments 46 defines a fore support member 49 and an aft support member 50 axially offset from one another. The shroud fore support member 49 is located upstream to the shroud aft support member 50 relative to the direction of the exhaust gases. The shroud fore and aft support members 49 and 50 have an "L" shape oriented downstream relative to the direction of the exhaust gases. The shroud fore and aft support members 49 and 50 protrude radially outwardly relative to a radially outer side 51 of the shroud segment 46. The shroud fore support member 49 has a radial portion 52 radially extending outwardly from the shroud outer side 51 and an axial portion 53 axially extending from a radially outer end of the shroud fore support member radial portion 52, in a downstream direction relative to the direction of the exhaust gases, toward the shroud aft support member 50. Similarly, the shroud aft support member 50 has a radial portion 54 radially extending outwardly from the shroud outer side 51 and an axial portion 55 axially extending from a radially outer end of the shroud aft support member radial portion 54, in the downstream direction, away from the shroud fore support member 49.

In the depicted embodiment, the shroud segment 46 has a portion 56 axially protruding downstream, away from the shroud aft support member 50. The shroud axially protruding portion 56 is configured to cover the housing aft support member axial portion 39.

Still referring to FIGS. 3a and 3b, the shroud fore and aft support members 49 and 50 are configured to mate with the turbine housing fore and aft support members 34 and 35, respectively. In the depicted embodiment, a timing pin 57 cooperates with the housing fore support member aperture 40 to lock the housing fore support member 34 with the shroud fore support member 49 and to prevent circumferential motion of the shroud segments 46 relative to the turbine housing 25. Once the housing fore and aft support members 34 and 35 are engaged with the shroud fore and aft support members 49 and 50, an air pocket, or cavity, 58 is defined between the housing inner side 27, the shroud outer side 51, the housing fore support member 34, and the shroud aft support member 50. In the depicted embodiment, the air pocket 58 is provided in the form of an annular conduit disposed radially between the turbine housing 25 and the shroud segments 46 and circumferentially extending around the turbine rotor 20.

The shroud segments 46 define a circumferentially extending axial gap 59 between an upstream side of the shroud fore support member radial portion 52 and a head of the turbine stator 22. The shroud segments 46 define a circumferentially extending radial gap 60 between the shroud axially protruding portion 56 and the housing aft support member axial portion 39. The shroud segments 46 define another circumferentially extending radial gap 61 between the shroud outer side 51 and the housing fore support member axial portion 37.

In the illustrated embodiment, each of the shroud segments 46 defines a conduit 62 and another conduit 63, downstream of the conduit 62. The shroud conduits 62 and 63 are configured to provide fluid flow communication between the air pocket 58 and the annular gas path 24. The shroud conduit 62 extends axially through the shroud fore support member radial portion 52. An inlet of the conduit 62, opening to the air pocket 58, is adjacent an upstream end of the housing fore support member axial portion 37. In the depicted embodiment, an outlet of the shroud conduit 62, opening to the axial gap 59, fluidly communicating with the annular gas path 24, is radially inward relative to the inlet of the shroud conduit 62. The inlet and the outlet of the shroud conduit 62 may be circumferentially aligned. Hence, a flow circulating in the conduit 62 flows toward the engine axis 19 and in a direction opposite the flow direction of the exhaust gases circulating in the annular gas path 24 to prevent hot gases of the gas path 24 from entering the cavity 59.

The shroud conduit 63 extends axially through the shroud aft support member radial portion 54. In the illustrated embodiment, an inlet and an outlet of the shroud conduit 63 are radially aligned relative to one another and may be circumferentially aligned. The inlet of the conduit 63 is radially disposed proximate the shroud outer side 51 and opens to the air pocket, or cavity 58. In the depicted embodiment, the outlet of the shroud conduit 63 opens to the radial gap 60 between the housing aft support member 35 and the shroud axially protruding portion 56. A flow circulating in the shroud conduit 63 circulates in the same direction as the exhaust gases.

A method of cooling the turbine housing 25 is therefore disclosed. In operation, and in accordance with the illustrated embodiment, a flow of coolant is routed toward the turbine section 18. The coolant enters the annular gap 30, defined between the turbine casing 29 and the turbine housing 25 through the series of apertures 31 defined in the turbine casing 29. Then, the coolant enters the impingement holes 44 defined between the turbine housing radially outer and inner sides 26 and 27. The coolant exits the impingement holes 44 inside the air pocket 58 defined between the turbine housing 25 and the shroud segments 46. The coolant, flowing in the direction of the exit flow axis 45, impinges the housing fore support member radial portion 36 at target T at an angle θ from 0 to 60 degrees. The coolant is then redirected in a mainly radial direction toward the intersections 43 defined between the housing fore support member radial portion 36 and the deflector rail 41. The coolant is then redirected radially outwardly away from the shroud outer side 51 by the deflector rail air deflecting surface 42. Hence, the air deflecting surface 42 precludes the coolant to impinge the shroud outer side 51. The coolant then exits the air pocket 58 through the radial gap 61 and through the shroud upstream conduit 62 thereby cooling the housing fore support member axial portion 37 and the shroud segment 46. The coolant also exits the air pocket 58 through the shroud downstream conduit 63 and through the radial gap 60 thereby cooling the housing aft support member axial portion 39 and the shroud axially protruding portion 56. In the present embodiment, the coolant is air bled from the engine compressor 12 at a pressure higher than an exhaust gases pressure in the annular gas path 24 to ensure the coolant flows inwardly from the annular gap 30 toward the annular gas path 24.

In a particular embodiment, impingement holes 44 may be provided to impinge on a deflector rail of the shroud aft support members 50. In an alternate embodiment, more than one impingement hole 44 per shroud segment 46 is provided.

The above description is meant to be exemplary only, and one skilled in the art will recognize that changes may be made to the embodiments described without departing from the scope of the invention disclosed. For example, although a turboprop engine is depicted in FIG. 1, it is to be understood that the turbine housing assembly as described herein can be used within other types of gas turbine engines, including turbofans, turboprops and turboshafts, for example. Still other modifications which fall within the scope of the present invention will be apparent to those skilled in the art, in light of a review of this disclosure, and such modifications are intended to fall within the appended claims.

The invention claimed is:

1. A gas turbine engine comprising
a housing surrounding a turbine shroud assembly,
the turbine shroud assembly supported inwardly of the housing by support members of the housing to define a cavity therebetween, the support members including a fore support member and an aft support member located downstream of the fore support member relative to a flow direction of exhaust gases circulating through a turbine section of the gas turbine engine,
the housing having impingement holes extending therethrough and defining an exit flow axis, the exit flow axis intersecting surfaces of at least some of the support members, the impingement holes extending through the housing between an inlet opening and an outlet opening, the outlet opening in the housing disposed radially inwardly relative to the inlet opening, the exit flow axis intersecting one or more surfaces of the fore support member,
the at least some of the supports members having a deflector rail extending laterally from a radially inner end of the fore support member toward the aft support member and having a flow redirecting surface facing at least partially radially outward,
the flow redirecting surface defined by the surfaces of the at least some of the support members and positioned and configured to redirect a cooling air flow away from the turbine shroud assembly;
an axial length of the deflector rail corresponding to from 5% to 15% of an axial length of the shroud assembly disposed around a rotor of the turbine section of the gas turbine engine.

2. The gas turbine engine according to claim 1, wherein the turbine shroud assembly includes a plurality of shroud segments disposed adjacent a radially-inner surface of the housing, the plurality of shroud segments surrounding the turbine section of the gas turbine engine.

3. The gas turbine engine according to claim 1, wherein an angle defined between the exit flow axis and the one or more surfaces of the support member is from 0 to 60 degrees.

4. The gas turbine engine according to claim 1, wherein an angle defined between the exit flow axis and a radially-inner surface of the housing is from 30 to 90 degrees.

5. The gas turbine engine according to claim 1, further having a turbine casing disposed radially outwardly relative to the housing and defining an annular gap therebetween, the annular gap fluidly connected with the impingement holes.

6. The gas turbine engine according to claim 5, wherein the turbine casing defines at least one aperture configured to receive the cooling air flow therein, the at least one aperture fluidly connected with the annular gap.

7. A gas turbine engine comprising,
in serial flow communication, a compressor section, a combustor, and a turbine section,
the turbine section having at least one turbine stage that includes a rotor surrounded by turbine shroud assembly having a plurality of shroud segments circumferentially surrounding the rotor, and a housing disposed around and supporting the plurality of shroud segments of the turbine shroud assembly,
the housing having impingement holes therein that open to a cavity defined between the housing and the plurality of shroud segments,
the impingement holes configured for feeding an impingement flow of cooling air and defining an exit flow axis extending therethrough,
the exit flow axis intersecting one or more surfaces of a support member of the housing located within the cavity, the support member being a fore support member located at an upstream side of the plurality of shroud segments, the housing having a deflector rail protruding laterally from a radially inner end of the fore support member into the cavity, the deflector rail forming an air deflecting surface facing away from the plurality of shroud segments for re-directing the impingement flow of cooling air away from the plurality of shroud segments;
an axial length of the deflector rail corresponding to from 5% to 15% of an axial length of the shroud assembly disposed around the rotor of the turbine section of the gas turbine engine.

8. The gas turbine engine according to claim 7, further comprising a turbine casing surrounding the turbine housing and defining an annular gap therebetween, the annular gap fluidly connected to the impingement holes.

9. The gas turbine engine according to claim 8, wherein the annular gap is fluidly connected to the compressor through at least one aperture defined the turbine casing.

10. The gas turbine engine according to claim 7, wherein an angle defined between the exit flow axis and the one or more surfaces of the support member is from 0 to 60 degrees.

11. The gas turbine engine according to claim 7, wherein an angle defined between the exit flow axis and an inner side of the housing is from 30 to 90 degrees.

* * * * *